US012618526B2

(12) United States Patent
Artusi

(10) Patent No.: US 12,618,526 B2
(45) Date of Patent: May 5, 2026

(54) NOZZLE FOR HIGH-PRESSURE CYLINDERS

(71) Applicant: CARBON CYLINDER S.R.L., Mira (IT)

(72) Inventor: Giovanni Artusi, Mira (IT)

( * ) Notice: Subject to any disclaimer, the term of this patent is extended or adjusted under 35 U.S.C. 154(b) by 211 days.

(21) Appl. No.: 18/551,242

(22) PCT Filed: Mar. 24, 2022

(86) PCT No.: PCT/EP2022/057817
§ 371 (c)(1),
(2) Date: Sep. 19, 2023

(87) PCT Pub. No.: WO2022/218672
PCT Pub. Date: Oct. 20, 2022

(65) Prior Publication Data

US 2024/0175553 A1 May 30, 2024

(30) Foreign Application Priority Data

Apr. 12, 2021 (IT) ........................ 102021000009098

(51) Int. Cl.
*F17C 13/04* (2006.01)

(52) U.S. Cl.
CPC .................................... *F17C 13/04* (2013.01)

(58) Field of Classification Search
CPC .............. F17C 13/04; F17C 2201/0157; F17C 2201/032; F17C 2201/058; F17C 2205/0305; F17C 2205/0323; F17C 2205/0329; F17C 2205/0338; F17C 2205/035
USPC ........................................... 220/582; 277/619
See application file for complete search history.

(56) References Cited

U.S. PATENT DOCUMENTS

| | | | | |
|---|---|---|---|---|
| 1,852,348 A * | 4/1932 | Hogan | .................... | F17C 13/06 220/582 |
| 8,096,441 B2 * | 1/2012 | Sato | .......................... | F17C 1/06 220/582 |

FOREIGN PATENT DOCUMENTS

| | | | | | |
|---|---|---|---|---|---|
| DE | 803872 | C * | 4/1951 | | |
| DE | 1299229 | B | 7/1969 | | |
| DE | 102015015004 | A1 * | 5/2017 | .............. | F17C 13/04 |
| EP | 0314609 | B1 | 5/1993 | | |
| FR | 3095848 | A1 | 11/2020 | | |
| WO | WO-2013099757 | A1 * | 7/2013 | .............. | F17C 13/00 |
| WO | WO-2021165843 | A1 * | 8/2021 | ............ | F17C 13/123 |

OTHER PUBLICATIONS

English Machine Translation of DE-803872-C (Year: 1951).*
(Continued)

*Primary Examiner* — Laura E. Parker
(74) *Attorney, Agent, or Firm* — EGBERT, MCDANIEL & SWARTZ, PLLC

(57) ABSTRACT

Nozzle for cylinders containing a high-pressure fluid, including: a lower body designed to be applied stably to the mouth of the cylinder; an intermediate component, housed rotatably in a seat of the lower body and designed to accommodate an accessory, such as a fluid dispensing tap, a valve, or other; and an upper ring nut element designed to engage with the lower body to lock stably in position the intermediate component, with the accessory oriented in the required direction with respect to the cylinder.

7 Claims, 5 Drawing Sheets

(56) References Cited

OTHER PUBLICATIONS

English Machine Translation of DE-102015015004-A1 (Year: 2017).*
English Machine Translation of WO-2013099757-A1 (Year: 2013).*
International Search Report for corresponding PCT/EP2022/057817 dated Jul. 4, 2022.
Written Opinion of the International Searching Authority for corresponding PCT/EP2022/057817 dated Jul. 4, 2022.

* cited by examiner

NOZZLE FOR HIGH-PRESSURE CYLINDERS

The present invention relates to a nozzle for cylinders, in particular for containing fluids (liquid or aeriform) at high pressure, provided with a tap or valve for dispensing the fluid.

Various types of high-pressure cylinders are known, obtained from an inner liner in metal or plastic material, on which a nozzle in metal material is attached, normally provided with a thread suitable for tightening a tap or a seal valve. The liner is then covered with one or more layers of reinforcing threads.

In the case of cylindrical cylinders with a circular cross section, the application of the nozzle does not create any problems, since the accessory it carries (tap, valve, etc.), oriented transversely to the axis of the cylinder, is always correctly oriented, thanks to the axial symmetry of the cylinder.

However, in the case of cylinders with a non-circular section, by way of a non-limiting example square or rectangular, which are currently becoming increasingly common, the end of the screwing stroke of the nozzle on the cylinder, or on the nozzle, can lead to incorrect directionality of the accessory.

The accompanying FIG. 1 shows schematically in axonometry a square section cylinder 1, having an internally threaded mouth 2 for screwing in an accessory. FIG. 2 is a plan view from above of the cylinder, with an accessory 3 mounted, such as, for example, a valve or a fluid dispensing tap according to the prior art, with the outlet orifice 4, not correctly oriented, while FIG. 3 is a view like that of FIG. 2, showing how the accessory 3 and the relative orifice 4 should be correctly oriented, along a median plane of two opposing faces of the cylinder, to facilitate handling thereof.

FR 3095848 A1 discloses a pressurised gas reservoir head assembly, comprising a structure having an opening and a head comprising a base arranged in the opening and a valve assembled with the base, wherein the base comprises a boss arranged outside the reservoir, at least one first pipe comprising an axial portion along the non-emerging axis connected to the inside of the reservoir, and at least one radial portion drilled radially into the boss until it reaches the axial portion, and wherein the valve has a substantially annular shape comprising a first bore corresponding to the boss in order to be able to be engaged on the boss and at least one second pipe, one end of which opens into the first bore axially in line with the at least one radial portion.

There is therefore the problem of providing a nozzle which can be mounted on a cylinder with a non-circular cross section, so as to ensure the required orientation of an accessory, in particular an accessory axially connected to the nozzle.

The object of the invention is precisely to achieve this objective.

More particularly, an object of the invention is to provide a nozzle structure or a structure which can be screwed to the nozzle itself, which allows the accessories to be given the correct directionality on each type of cylinder.

Another object of the invention is to provide such a nozzle which ensures an excellent seal to the fluid contained in the cylinder.

Yet another object of the invention is to provide such a nozzle which is easily assembled and disassembled, as well as simple and inexpensive to manufacture.

These and other objects of the invention are achieved by the nozzle according to the invention, which has the features of the appended independent claim 1.

Advantageous embodiments of the invention are disclosed by the dependent claims.

Substantially, the nozzle for cylinders containing a high-pressure fluid comprises: a lower body designed to be stably applied to the mouth of the cylinder; an intermediate component, rotatably housed in a seat of the lower body and apt to accommodate an accessory, such as a fluid dispensing tap, valve, or other; and an upper ring nut element apt to engage with said lower body to hold the intermediate component firmly in position, with said accessory oriented in the required direction with respect to the cylinder, wherein said seat is provided internally to said lower body, and wherein the upper end section of the wall of said lower body has an internal thread with which an external thread of the upper ring nut element engages in order to hold the intermediate component in the required angular position.

Further features of the invention will be made clearer by the following detailed description, referred to its embodiments purely by way of non-limiting example, illustrated in the accompanying drawings, in which.

Figure 5A:
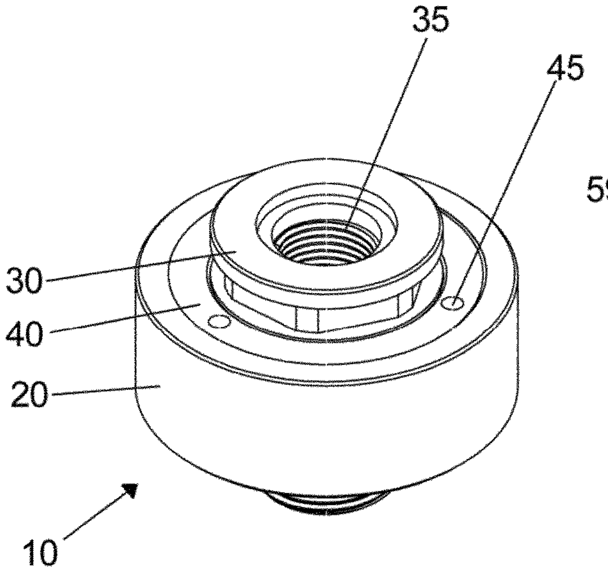
Figure 5B:
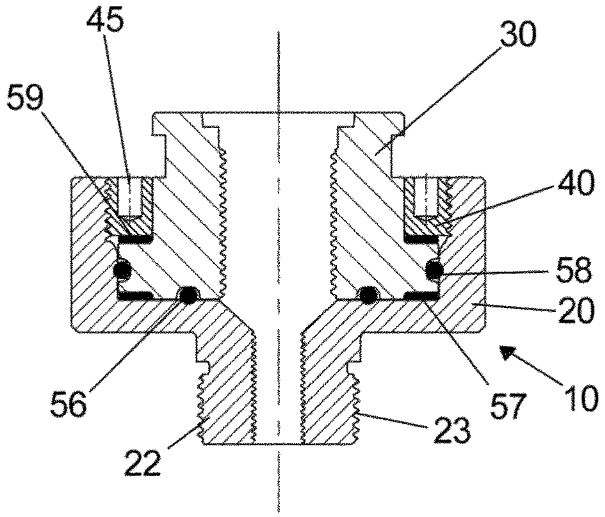
Figure 4A:
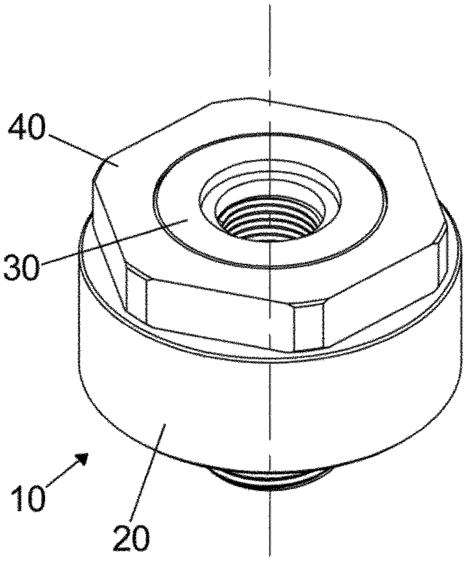
Figure 4B:
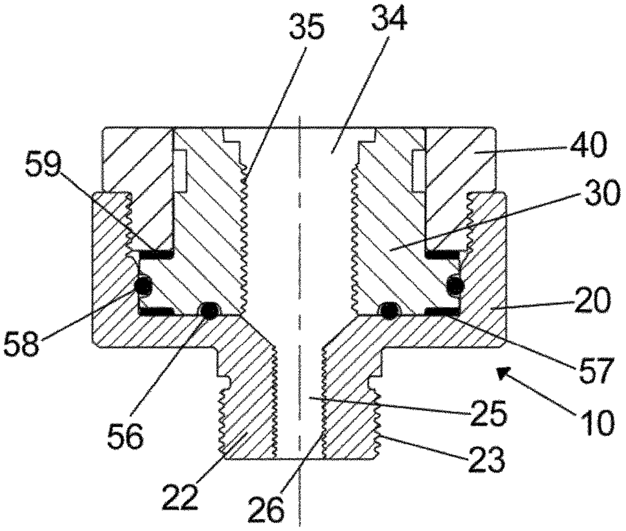
Figure 4C:
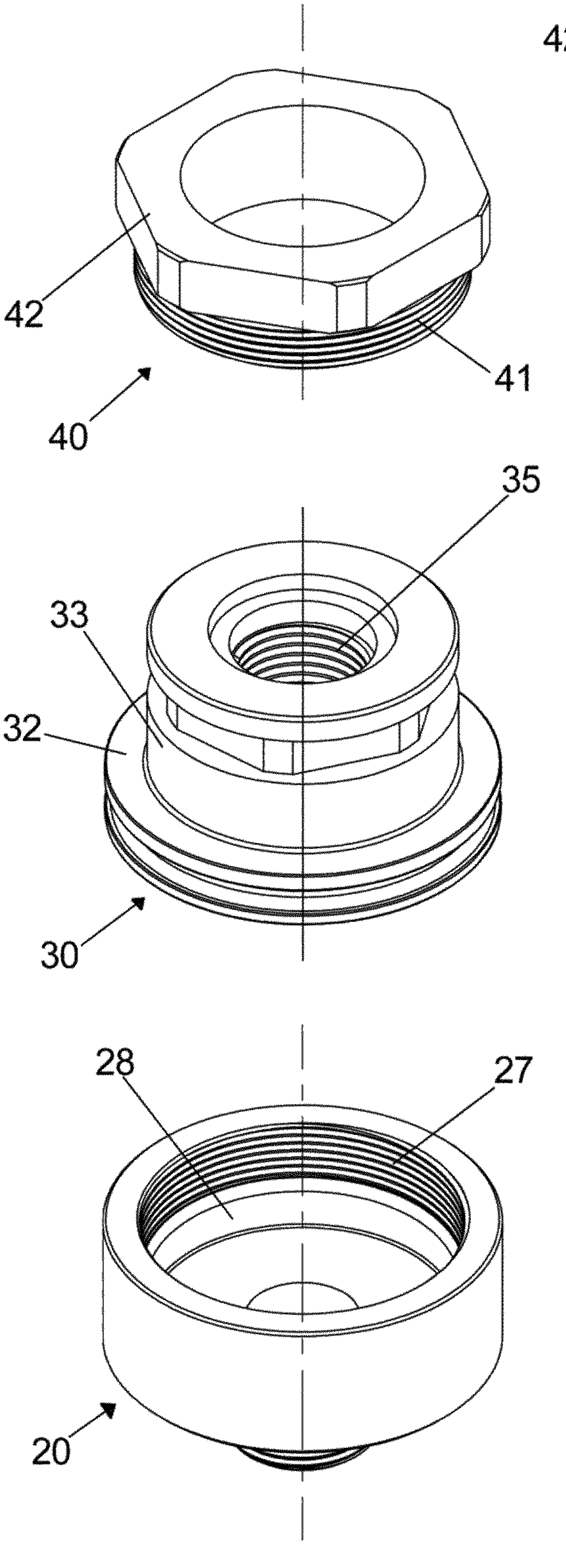
Figure 4D:
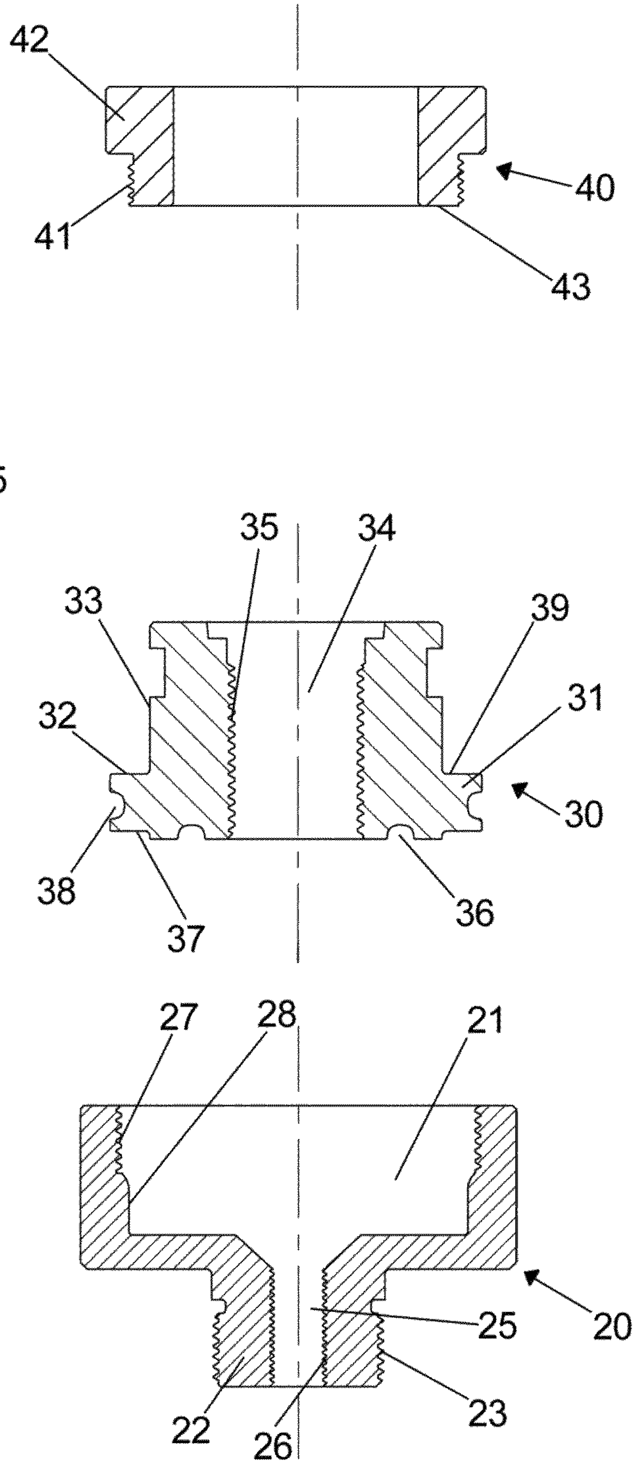
Figure 5C:
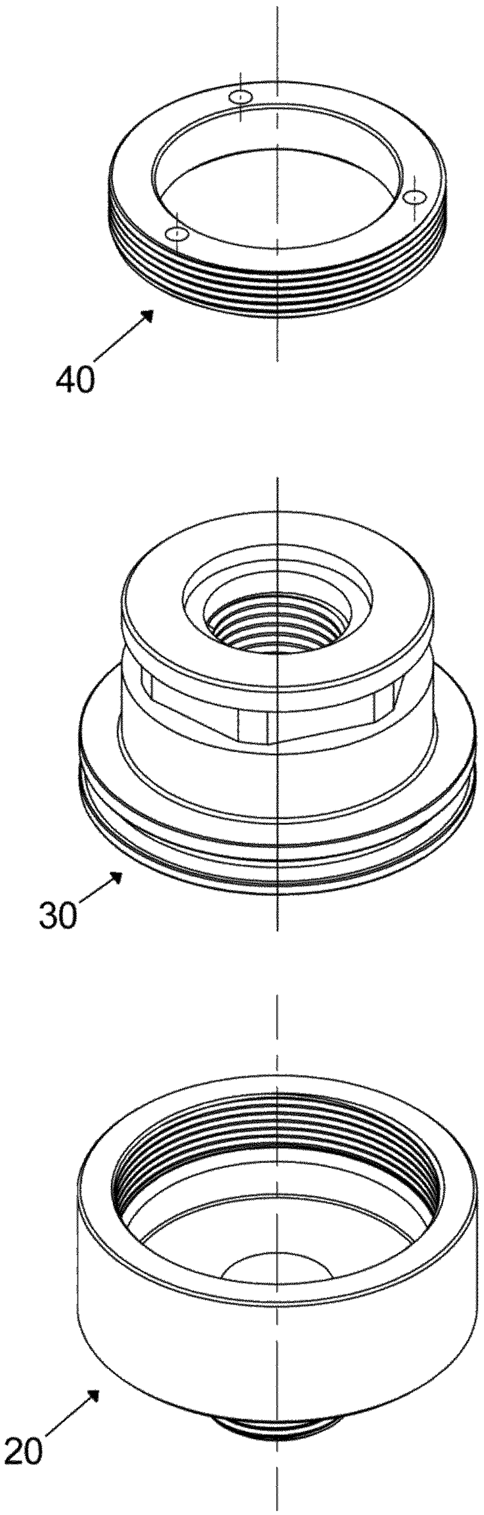
Figure 5D:
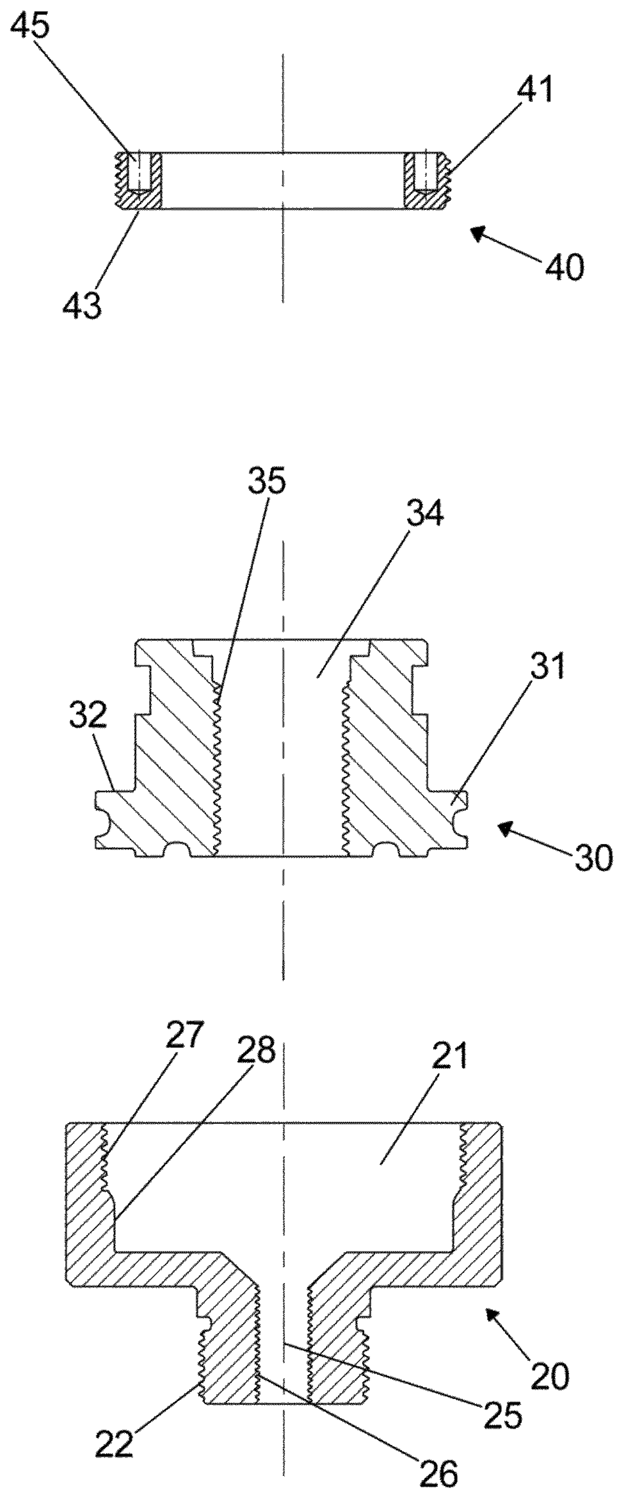
Figure 6A:
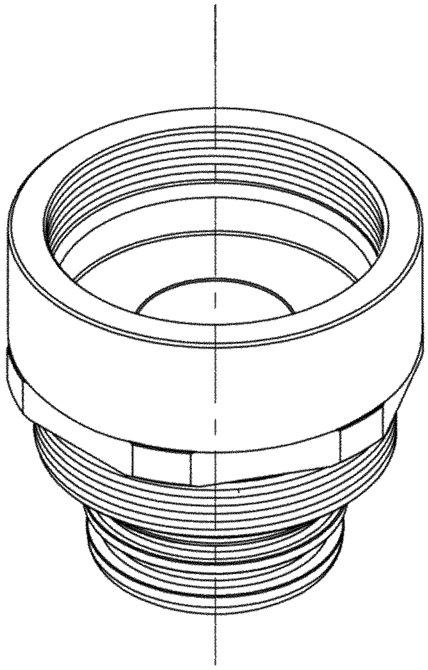
Figure 6B:
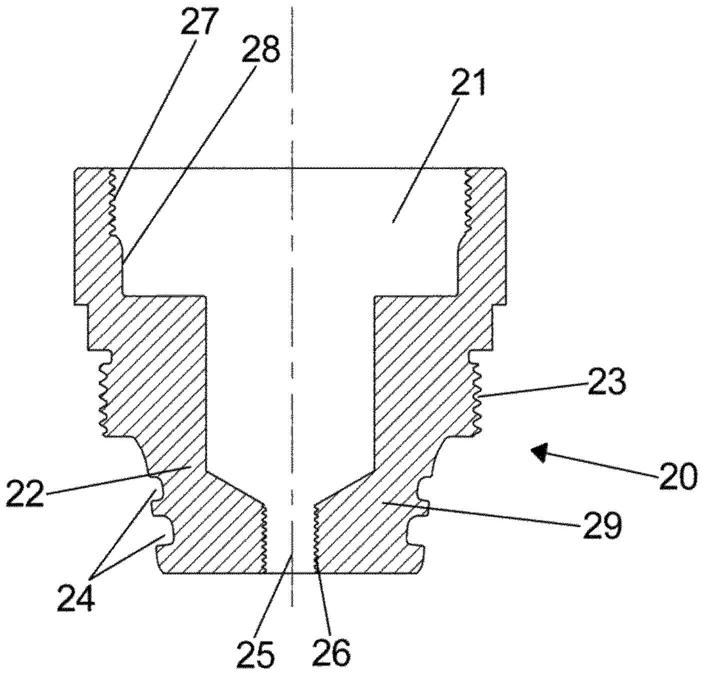

FIGS. 4*a* and 4*b* are overall views, respectively in axonometry from above and in median section, of a nozzle according to a first embodiment of the invention:

FIGS. 4*c* and 4*d* are blown-up views of FIGS. 4*a* and 4*b*, respectively:

FIGS. 5*a* and 5*b* are overall views, respectively in axonometry from above and in median section, of a nozzle according to a second embodiment of the invention:

FIGS. 5*c* and 5*d* are blown-up views of FIGS. 5*a* and 5*b*, respectively:

FIGS. 6*a* and 6*b* are, respectively, an axonometric view from above and a median section view of a different embodiment of the lower body of the nozzle of the preceding drawings.

Referring to FIGS. 4*a-d*, the nozzle according to the invention, denoted overall by reference numeral 10, comprises a lower body 20, a central or intermediate component 30 and an upper element 40.

Figure 1:
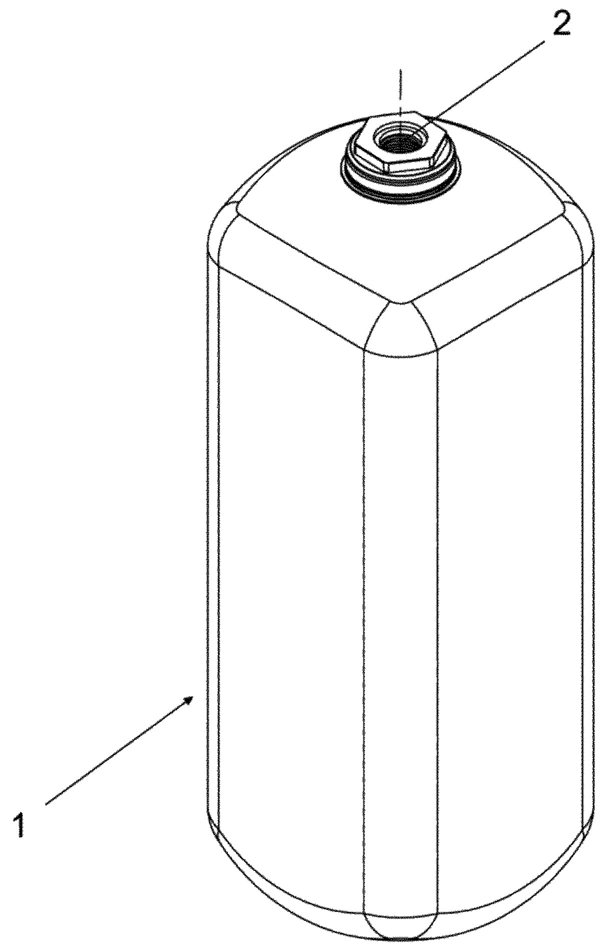
FIG. 1 is a schematic view in axonometry of a square-section high-pressure cylinder without the fluid dispensing nozzle.
Figure 2:
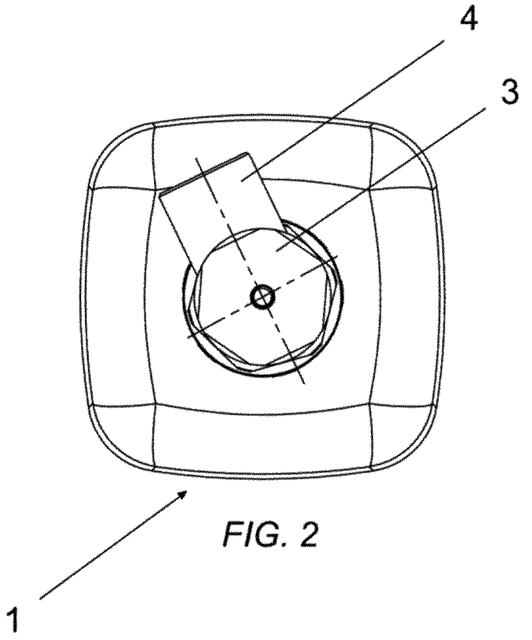
FIG. 2 is a plan view from above of the cylinder of FIG. 1, with a nozzle mounted according to the prior art, in which a fluid dispensing tap is not correctly oriented.

The lower body 20 has a cup shape with a cylindrical upper seat 21 suitable for housing the intermediate component 30 and a shank 22 projecting below bearing an external thread 23 suitable for screwing in, for example, with the internal thread of the mouth 2 of the container 1 of FIG. 1, remaining stably fixed with respect thereto.

The shank 22 has an axial hole 25 for the passage of the fluid, which in this case has a thread 26 for mounting an accessory, such as for example an EFV (Excess Flow Valve).

The upper end section of the wall of the body 20 has an internal thread 27 with which the external thread 41 of the upper element 40 engages in order to lock the intermediate component 30 in the required angular position.

In fact, the component 30 is housed freely rotatably in the seat 21 of the body 20 and has a widened base 31 extending for a height substantially corresponding to the unthreaded lower section 28 of the wall of the body 20, so as to determine a step or shoulder 32 in the area of joining with the upper section of smaller diameter 33 of the component 30.

The upper element 40 is substantially a locking ring nut also having a play recovery function, having a hexagonal head 42, for the engaging of a tightening key, which abuts against the upper edge of the wall of the body 20, while the lower edge 43 of its wall with external thread 41 abuts against the shoulder 32 of the intermediate component 30, in order to lock it securely in position.

Figure 3:
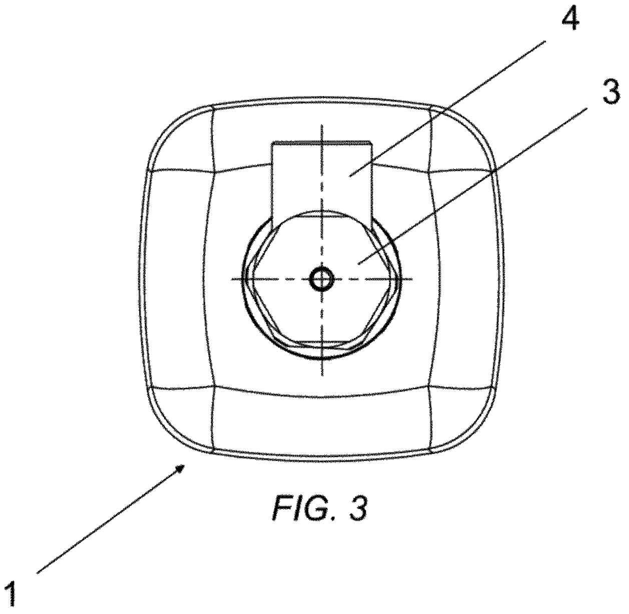
FIG. 3 is a view like that of FIG. 2, showing how the fluid dispensing tap should be correctly oriented.

The intermediate component 30, which has an axial through hole 34, has an internal thread 35 with which an interchangeable axial accessory, for example the fluid dispensing accessory 3 shown in FIG. 3, goes to be screwed.

The nozzle structure according to the invention, thanks to the arrangement of the component 30 in the body 20 with possibility of rotation before tightening with the ring nut 40, allows conferring of the correct directionality to the fluid dispensing accessory, on the basis of the geometric conformation of the cylinder on which it is applied.

Thus, for example, in the case of FIG. 3, the nozzle is locked into position in such a way that the accessory is oriented along a median plane of the square section cylinder.

The intermediate component 30 has a plurality of annular seats for sealing gaskets, in particular: a semi-circular seat 36 and a flat seat 37 arranged on its bottom wall, suitable for accommodating an O-ring type sealing ring 56 and a sealing gasket in metal/plastic material 57 which abuts against the bottom of the seat 21 of the body 20; a semi-circular seat 38 on the edge of the widening 31 suitable for accommodating a sealing ring 58 which abuts against the inner side wall of the body 20, and a flat seat 39 on the upper part of the widening 31, coinciding with the shoulder 32, suitable for accommodating a gasket in metal/plastic material 59 which abuts against the lower edge 43 of the upper ring nut element 40.

According to needs, the seats 36-39 can all be used to accommodate the respective gaskets 56-59, or according to various combinations, guaranteeing, in any cases, so that the seal is effective, the presence of at least two seats with the respective gaskets.

The embodiment of FIGS. 5*a*-5*d* is entirely similar to that of FIGS. 4*a*-4*d*, with the exception of the upper ring nut element 40 which is devoid of the hexagonal head 42, and is therefore more flattened, having above a series of holes 45 for engaging a suitable tightening key.

In this case, the ring nut element is placed flush with the upper edge of the body 20 (FIG. 5*b*).

FIGS. 6*a* and 6*b* show an alternative embodiment of the lower body 20 of the nozzle, which differs from the preceding ones in that a lower conical extension 29 is provided, in such a way that the nozzle 10 is shaped to be able to adapt to the high-pressure cylinders described in Italian patent applications No. 102021000003650 and No. 102021000006806, which have not yet been published. One or more seats for sealing gaskets 24 are provided on this extension 29.

It is however evident that the body 20, like also the intermediate component 30 and the upper ring nut element 40, can be variously shaped, provided that the component 30 is housed with the possibility of rotation in the body 20 where it is blocked by the ring nut element 40.

From what has been disclosed, the advantages of the nozzle for high-pressure cylinders according to the invention appear clear, which allows the right directionality to be given to the interchangeable elements which it can mount, such as, in particular, a tap, a valve or the like, on the basis of the geometry of the cylinder on which it is applied.

Naturally the invention is not limited to the particular embodiment previously described and illustrated in the accompanying drawings, but numerous detailed changes may be made thereto within the reach of the person skilled in the art, without thereby departing from the scope of the invention itself, as defined in the following claims.

The invention claimed is:

1. A nozzle for use with a cylinder that contains a high-pressure fluid, the nozzle comprising:

a lower body adapted to be applied to a mouth of the cylinder;

an intermediate component rotatably housed in a seat in said lower body, said intermediate component adapted to receive an accessory therein; and an upper ring nut element engageable with said lower body so as to stably hold said intermediate component in position such that the accessory is oriented with respect to the cylinder, wherein the seat is internal of said lower body, an upper section of a wall of said lower body having an internal thread, said upper ring nut having an external thread that engages the internal thread of said lower body so as to maintain said intermediate component in the position, wherein said lower body has a shank therebelow, the shank having an external thread adapted to engage with an internal thread of the mouth of the high-pressure cylinder, wherein said intermediate component has a widened base connected to an upper section, the upper section having a shoulder or step, the upper section having a diameter less than a diameter of the widened base, wherein a lower edge of said upper ring nut element abuts the step or shoulder.

2. The nozzle of claim 1, wherein said intermediate component has a plurality of annular seats, at least one annular seat of the plurality of annular seats receiving a sealing gasket thereon.

3. The nozzle of claim 1, wherein the shank has another internal thread adapted to receive another accessory.

4. The nozzle of claim 1, wherein said upper ring nut element has a polygonal head adapted to engage with a tightening key, the polygonal head abutting an upper edge of the wall of said lower body.

5. The nozzle of claim 4, wherein said upper ring nut element has a series of holes adapted to receive the tightening key, said upper ring nut element being flush with the upper edge of said lower body.

6. The nozzle of claim 1, wherein said lower body has a lower conical extension.

7. The nozzle of claim 1, wherein the nozzle is adapted to be applied to a non-circular section of the high-pressure cylinder.

* * * * *